March 11, 1930.  J. R. MARES  1,750,235
ENGINE LUBRICATION MEANS
Filed Dec. 5, 1927  2 Sheets-Sheet 2
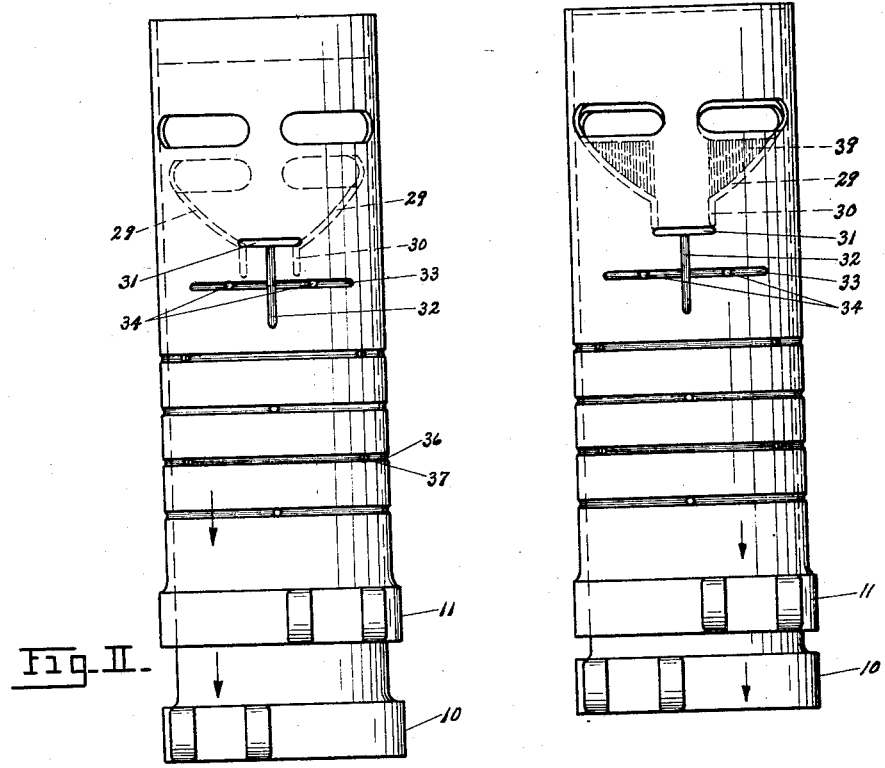
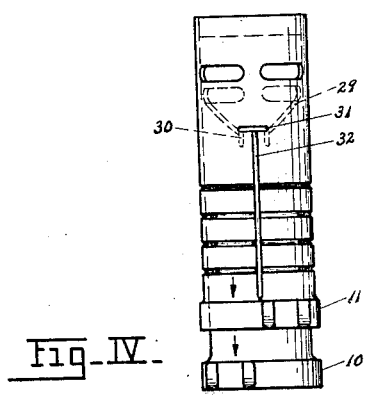
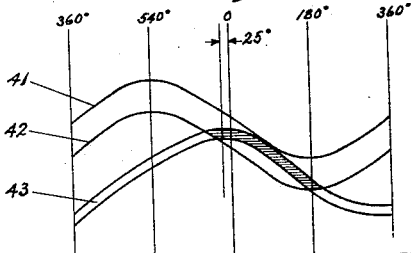
INVENTOR.
JOSEPH R MARES.
BY Chester H. Broselton
ATTORNEY.

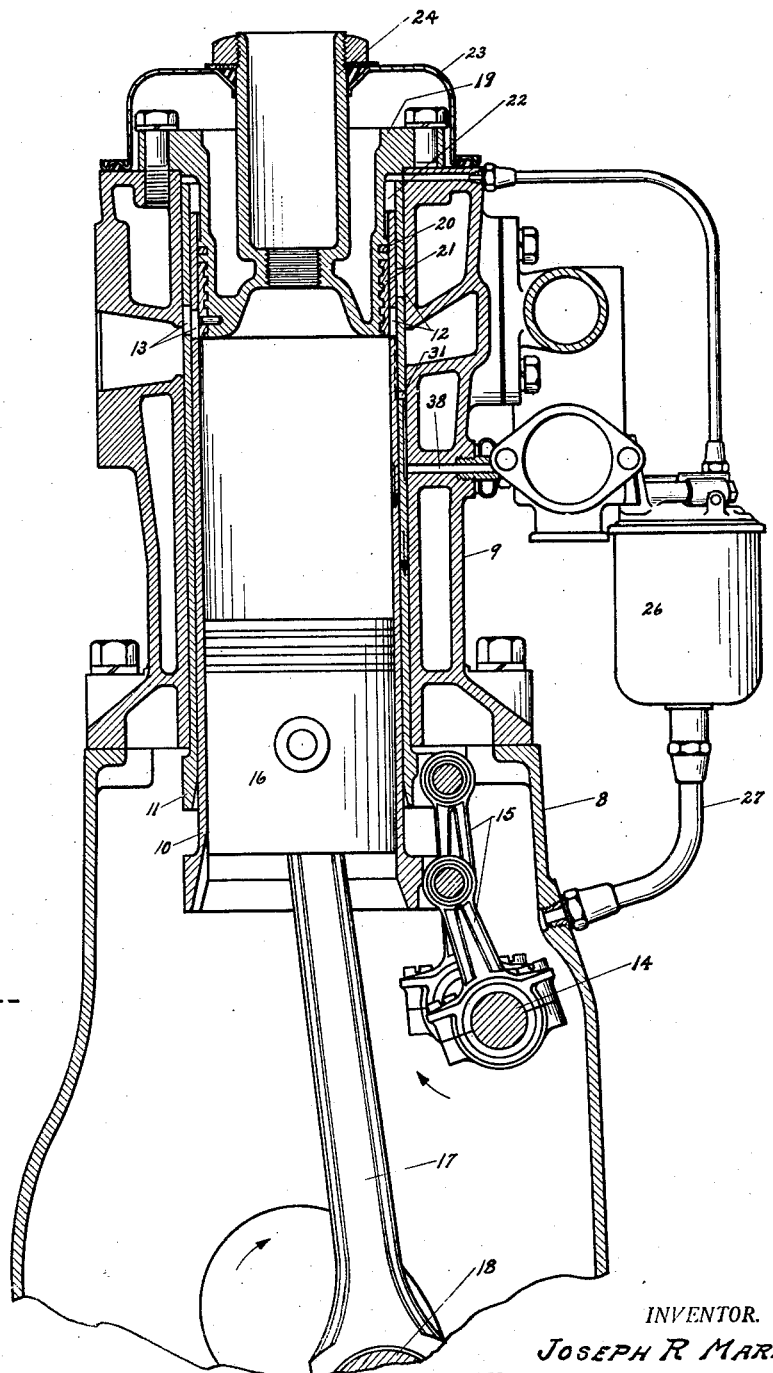

Patented Mar. 11, 1930

1,750,235

UNITED STATES PATENT OFFICE

JOSEPH R. MARES, OF TOLEDO, OHIO, ASSIGNOR TO THE WILLYS-OVERLAND COMPANY, OF TOLEDO, OHIO, A CORPORATION OF OHIO

ENGINE-LUBRICATION MEANS

Application filed December 5, 1927. Serial No. 237,635.

My invention relates to sleeve valve engines and it has particular relation to the lubrication and general operating characteristics of the valve sleeves.

The invention has for its principal object the improvement in the lubrication of the sleeves without incurring excessive oil consumption or the smoking difficulties which are frequently encountered.

It is a further object of this invention to improve the circulation of oil over the surfaces of the sleeves, particularly the upper extremities without drawing excessive quantities of oil into the combustion chamber by way of the intake ports.

It is also an object of the invention to provide a sleeve valve structure in which a relatively large quantity of oil may be circulated over the surface of the sleeve without being drawn into the combustion chamber.

Another object of the invention is to employ the burned gases within the engine cylinder to control the flow of oil over the surface of the sleeves. More particularly the invention contemplates the utilization of exhaust gases for the purpose of dispelling accumulations of oil on the surface of the sleeve in the vicinity of the intake ports, and also to intercept the normal flow of oil from the lower portions of the sleeves into the combustion chamber as, by way of the intake ports.

In sleeve valve engines, such for example as the Knight engine, lubrication of the valve sleeves is realized by supplying a quantity of oil to the lower extremities of the sleeves, and permitting it to rise upwardly to the upper extremities. The upward movement is facilitated by the reciprocative action of the sleeves, as well as the natural tendency of oil to spread over adjoining surfaces. This tendency of oil to rise upwardly may likewise be encouraged by suction means disposed near the upper extremity of the sleeves, for example, adjacent the sleeve chamber, where it will operate to draw upwardly quantities of oil, normally lodged on the lower surfaces of the sleeves. Uniformly, the source of suction employed is the intake manifold. The amount of depression within the intake manifold varies, however, and as a result, the efficacy of these devices to control the lubrication is dependent upon the load and speed of the engine. According to the present invention the burned gases within the combustion chamber are employed to keep the surface of selected portions of the sleeve free from excessive quantities of oil.

A better understanding of the principles of the invention may be had by referring to the drawings, in which Figure I is a sectional view of a Knight engine illustrating an embodiment of the invention which may be preferred.

Fig. II is an elevational view of the intake side of the valve sleeves, and illustrates the relation of the intake ports and recesses extending therefrom.

Fig. III is likewise an elevational view of the intake port side of the sleeves disclosing a modification of the invention illustrated in Figs. I and II.

Fig. IV is an elevational view of the intake port side of the reciprocative sleeves of a Knight engine, which discloses an embodiment of the invention requiring no suction means, and Fig. V is a timing diagram which illustrates the period of each cycle during which the exhaust gases are being discharged through the recessed portion.

In Figure I there are disclosed the major elements comprising a Knight engine. These include a crankcase member 8 to which is bolted a water jacketed cylinder block 9 that is provided with intake and exhaust ports; two concentric reciprocative sleeves 10 and 11 each having inlet and exhaust ports 12 and 13 respectively are cooperatively disposed with respect to the ports in the cylinder block and which are actuated by means of an eccentric shaft 14 and valve connecting rods 15, in timed relation with respect to a piston 16. The piston is connected to a crankshaft 18 by means of a connecting rod 17 which is of conventional design.

A cylinder head 19 equipped with compression and sealing rings 20 and 21 respectively, is bolted to the cylinder block and extends a short distance within the inner sleeve 10. It is so disposed with respect to the upper extremities of the sleeves and the cylinder block as to leave a closed annular space often designated as the sleeve chamber 22. A cover plate 23 is tightly fitted over the block and in engagement with the well portion 24 of the head to form a water tight seal. Cooling water is circulated through the jacket of the block and is subsequently conducted through the head and finally to the radiator.

The movable members particularly the piston and reciprocative sleeves, are lubricated by means of oil that is splashed or sprayed thereon by reason of the rapidly rotating motion of the crankshaft through which oil is pumped under pressure. The oil so engaging the lower portions of the sleeves is caused to rise upwardly by reason of the relative reciprocative action of the sleeves and piston and distributes itself over the upper portions of the sleeves. It is deemed unnecessary to describe in detail the less important features of the construction and the operation of the engine, inasmuch as these are matters which are well known and clearly understood by those skilled in the art.

In order to facilitate the upward progress of the oil from the lower extremities of the sleeves, it is common practice to create a partial vacuum within the sleeve chamber. This not only overcomes the positive pressure which normally exists therein by reason of the "blow-by", but also serves to remove excessive quantities of lubricant which may accumulate thereon. The intake manifold is generally selected as a source of vacuum and is connected to the sleeve chamber by way of an oil trap mechanism 26 which is adapted to discharge its oil into the crankcase through a pipe 27. For a complete understanding of the construction of such an oil trap and the manner in which it is connected to the sleeve chamber, reference may be had to the co-pending application Serial No. 186,884.

Although an engine so equipped with an oil trap gives very satisfactory results, the operation is materially improved and the oil consumption lessened by intercepting the normal flow of oil from the lower portions of the sleeves into the combustion chamber by way of the intake ports. It has been suggested that this flow of oil be lessened by introducing a suction means below the ports which will act upon the surface of the sleeve and withdraw lubricant therefrom. Such an embodiment, however, not only reduces the amount of oil over the entire surface which is undesirable, but requires that an oil trap be provided which will discharge the oil, drawn off the surfaces of the sleeves, back to the crankcase. According to the present invention, improved results are attainable even without the necessity of an oil trap mechanism by utilizing a portion of the exhaust gases to control the flow of oil over the surface of the sleeves and otherwise guard against its tendency to enter the combustion chamber through the intake ports.

In the embodiment illustrated in Figs. I and II the intake ports on the inner sleeve are provided with downwardly extending converging grooves 29 which terminate in short parallel axial grooves 30. These grooves in turn are communicative with a transverse slot 31 in the outer sleeve from which there extends a short axial groove 32 along the outer surface. The latter axial groove may be traversed by a transverse groove 33 which, if desired, may include one or more oil distributing holes 34. In other respects, the sleeves are of conventional design, having a plurality of oil distributing grooves 36 and holes 37 over the surfaces thereof.

It will be noted that when the intake port of the inner sleeve is exposed to form a part of the combustion chamber and the slot 31 registers with grooves 30, fluid may pass through the converging grooves and into the axial groove by way of the slot, from which point it may be drawn through an opening 38 in the block into the oil trap 26. Throughout the intake stroke, the suction means functions to eliminate accumulations of oil on intake port side of the outer sleeve. The combination results in a barrier to the flow of excessive quantities of oil into the intake ports since the combusted gases will carry the oil through grooves and slots away from the intake port area to adjoining areas of the sleeves where it cannot penetrate the chamber.

In the modification illustrated in Fig. III the surface below the intake port is provided with a plurality of relatively shallow parallel grooves 39 in addition to the deeper converging grooves 29 previously described. The shallow grooves discharge into the converging grooves and function to aid in the removal of the oil from this portion of the sleeve.

In Fig. IV the axial groove 32 is extended to the base of the sleeve where it discharges directly into the crankcase thereby obviating the necessity of any external connections. The diagram in Fig. V is a graphic representation illustrating one complete cycle of the sleeves, during a portion of which fluid flows from the combustion chamber through the recessed portions of the sleeves. The wider area limited by lines 41 and 42 describes the path of the short grooves 30 formed in the inner sleeve. The narrower band 43 illustrates the path described by the slot 33 formed in the outer sleeve. The shaded area defines the limits during which the slot 31 registers with the axial grooves 30 and fluid flows from the combustion chamber through the recessed portion. This time interval may be varied if desired by changing the relative positions or sizes of the slot and grooves. The vertical lines in this view designate the position of the piston, the piston, making two complete revolutions to one by either of the sleeves.

By practicing the present invention one is enabled to localize the area from which the oil is withdrawn since the ability of the exhaust fluids to remove oil immediately adjacent the intake ports is more marked than that of the suction means, such as have been suggested for this purpose heretofore. The device may be employed in conjunction with the conventional oil trap of the so-called suction type or may be operated independently thereof. Moreover, the changes which are requisite in order to incorporate the principles of the invention in an ordinary Knight engine do not necessitate the introduction of additional mechanical elements but require simply that the sleeves be recessed to afford the proper time interval for the escape of the exhaust fluids.

It will be observed that the efficacy of the device depends in part upon the pressure of the fluids which are being exhausted, and inasmuch as this pressure varies directly with the load on the engine, and inasmuch as the sleeves are frequently under-lubricated at high speeds and full load conditions, the invention may readily be employed in conjunction with auxiliary oiling means, such as are operated automatically by the accelerator of the engine. Certain well known auxiliary oiling means are adapted to function only after the accelerator has reached a predetermined advanced position. Such an auxiliary oiling device combined with the present invention will not only afford adequate lubrication for the upper extremities of the sleeves, but will prevent excessive oil consumption caused by the suction from the intake port which is exerted on the surface of the sleeves.

Although there is illustrated and described but a single embodiment of the principles of the invention together with several slight modifications thereof, it will be understood by those skilled in the art that these are given merely by way of example and that the principles may be suscepted to many other modifications without departing from the scope thereof, and I desire therefore that they be limited only as indicated in the appended claims.

I claim:

1. The combination with a sleeve valve engine having a valve sleeve provided with an intake port, of means aided by exhaust gases to remove excess oil from the surface of the sleeves in the intake port region.

2. A sleeve valve engine having a valve sleeve adapted to conduct exhaust gases over selected portions of the surface of the sleeve and thereby remove excess oil therefrom.

3. A sleeve valve engine having a valve sleeve adapted to conduct exhaust gases over the surface of the sleeve and provided with means cooperative with a source of suction adapted to remove the exhaust fluid from the surface of said sleeve.

4. A Knight engine provided with reciprocative sleeves adapted to conduct exhaust gases over the surface of said sleeves and thereby remove excess oil therefrom.

5. A Knight engine provided with reciprocative sleeves adapted to conduct exhaust gases over the surface of said sleeves, and suction means cooperative therewith for receiving the exhaust gases from the surface thereof.

6. A Knight engine provided with reciprocative sleeves recessed to conduct exhaust gases over a selected portion of the sleeves removing thereby excess oil from the surface of said sleeves.

7. A Knight engine provided with reciprocative sleeves having recesses to conduct exhaust gases over a selected portion of the sleeves, thereby removing excess oil, and suction means communicative with the recesses for withdrawing the exhaust gases and oil.

8. A Knight engine provided with concentric reciprocative sleeves, at least one of which includes recesses extending downwardly and away from the intake ports to permit exhaust gases to flow away therefrom.

9. A Knight engine having concentric sleeves, the inner sleeve being provided with recess portions connected with and extending away from the intake port, the outer surface of the outer sleeve being in communication with the recessed portion.

10. A Knight engine having concentric sleeves, the inner sleeve being provided with recess portions connected with and extending away from the intake port, the outer surface of the outer sleeve being in communication with the recessed portion, and suction means cooperative with the recessed portion adapted to withdraw fluid therefrom.

11. A Knight engine having concentric reciprocative sleeves including intake ports, the inner sleeve being provided with a recessed portion extending away from the intake port, and suction means adapted to intercept the path of the flow of oil from the lower portion of the sleeve through the recessed portion into the intake port.

12. A Knight engine having concentric reciprocative sleeves including intake ports, at least one of said sleeves having a recessed portion in communication with and extending away from the intake port.

13. A Knight engine having concentric reciprocative sleeves including intake ports, the surface of at least one of said sleeves adjacent the intake port being recessed to promote a flow of fluid from the cylinder therethrough to oppose the natural tendency of oil to penetrate the combustion chamber of the engine by way of the intake port.

14. A Knight engine having a combustion chamber and concentric reciprocative sleeves including intake ports, the surface of at least one of said sleeves having channels therein, in communication with the engine combustion chamber adapted to promote the flow of fluid from the cylinder to oppose the tendency of the oil to penetrate the combustion chamber of the engine by way of the intake ports.

15. A method of operating sleeve valve engines that comprises exhausting a portion of the combusted gases within the engine over the surface of the sleeve whereby the tendency of the oil to flow from the lower extremities of the sleeves into the combustion chamber by way of the intake port is diminished.

In testimony whereof, I affix my signature.

JOSEPH R. MARES.